Oct. 23, 1962    J. J. BARUCH ETAL    3,059,287
APPARATUS FOR AND METHOD OF SOUNDPROOF CLOSURE SEALING
Filed March 20, 1958    11 Sheets-Sheet 1

INVENTORS
Jordan J. Baruch
Bill G. Watters
BY
Rines and Rines
ATTORNEYS

Oct. 23, 1962 J. J. BARUCH ETAL 3,059,287
APPARATUS FOR AND METHOD OF SOUNDPROOF CLOSURE SEALING
Filed March 20, 1958 11 Sheets-Sheet 2

INVENTORS
Jordan J. Baruch
Bill G. Watters
BY
Rines and Rines
ATTORNEYS

INVENTORS.
Jordan J. Baruch
Bill G. Watters
BY
Rines and Rines
ATTORNEYS

INVENTORS
Jordan J. Baruch
Bill G. Watters
BY Rines and Rines
ATTORNEYS

INVENTORS
Jordan J. Baruch
Bill G. Watters

BY Rines and Rines

ATTORNEYS

Oct. 23, 1962        J. J. BARUCH ETAL        3,059,287
APPARATUS FOR AND METHOD OF SOUNDPROOF CLOSURE SEALING
Filed March 20, 1958                          11 Sheets-Sheet 7

INVENTORS
Jordan J. Baruch
Bill G. Watters
BY
Rines and Rines
ATTORNEYS

Oct. 23, 1962 J. J. BARUCH ETAL 3,059,287
APPARATUS FOR AND METHOD OF SOUNDPROOF CLOSURE SEALING
Filed March 20, 1958 11 Sheets-Sheet 9

INVENTORS
Jordan J. Baruch
Bill G. Watters
BY
Rines and Rines
ATTORNEYS

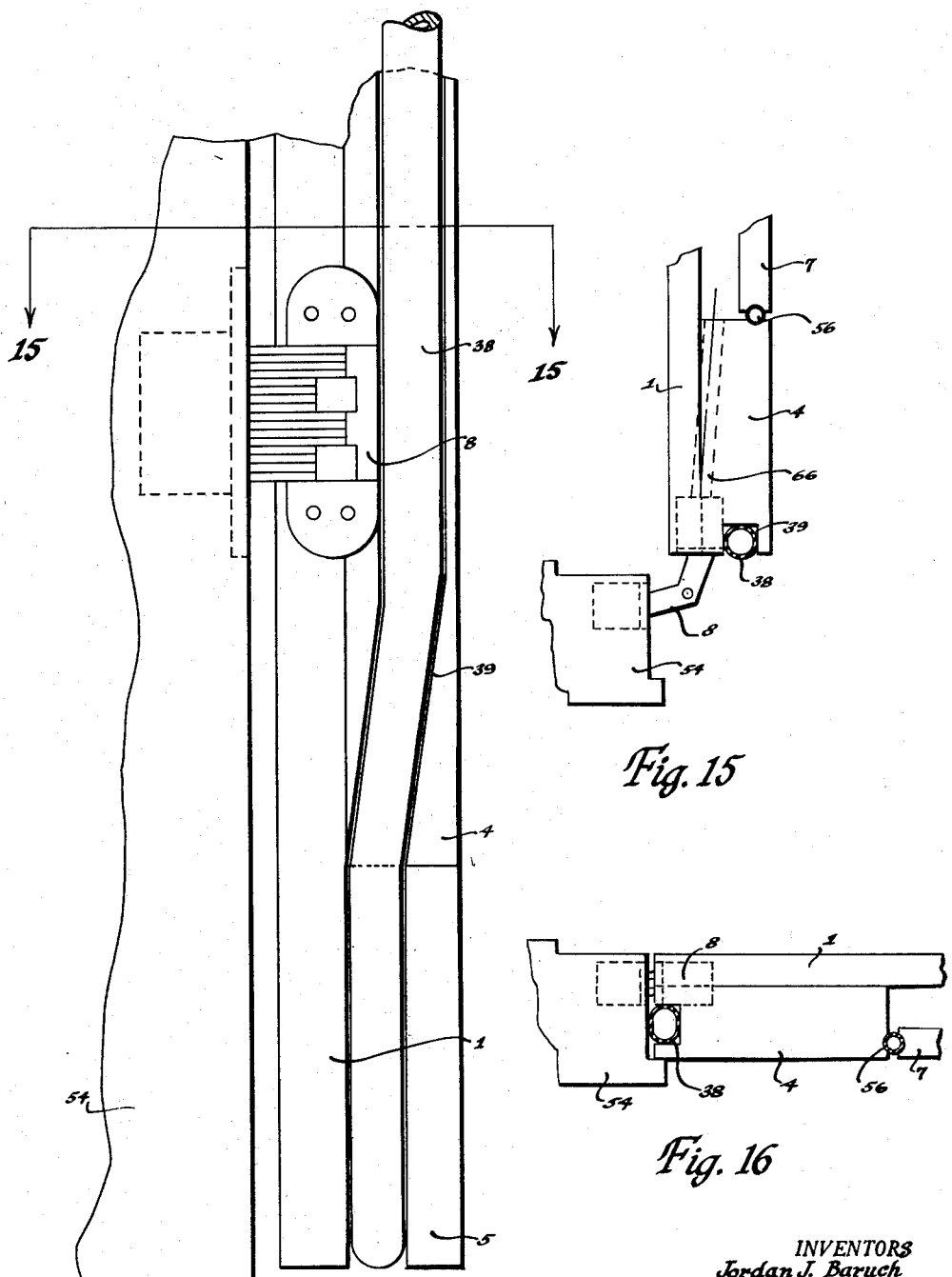

United States Patent Office 3,059,287
Patented Oct. 23, 1962

3,059,287
APPARATUS FOR AND METHOD OF SOUND-PROOF CLOSURE SEALING
Jordan J. Baruch, Newton, and Bill G. Watters, Nahant, Mass., assignors to Bolt Beranek and Newman, Inc., Cambridge, Mass., a corporation of Massachusetts
Filed Mar. 20, 1958, Ser. No. 722,749
12 Claims. (Cl. 20—16)

The present invention relates to soundproof closures and the like, and, more particularly, to apparatus for and methods of sealing a closure member by energy stored within the mechanism thereof during the process of opening or closing the closure member.

Ordinary doors have little or no provision for making an airtight seal against the door frame or jamb. Such doors are thus not entirely weatherproof, dustproof or sound isolating. Some so-called sealed closures have been proposed, but these are generally bulky and difficult to operate. Included in such proposals, for example, are refrigerator doors, oven doors, so-called soundproof doors, closures for paint rooms and dust laden areas, all generally employing a resilient gasket near an edge which is pressed between the mating surfaces of the door or closure and the frame in which the closure is placed. This construction inherently requires a door assembly which is larger than the opening, and necessitates large pressure between the door and the mating surface of the frame. In order to distribute this pressure evenly around the edge of the door, several latches are usually required. With one latch, the door will warp and cause unsealed areas to result near the corners which are remote from the latch, so that a flange is customarily disposed all around the door, giving rise to a raised door sill against which the flange at the bottom of the door may seal. Such a door sill, however, is objectionable in many instances, especially where objects must be wheeled through the opening. Alternatively, some closures employ a drop seal at the bottom of the door which makes contact with floor, but leaks are inherent at the corners between the bottom-edge drop seal and the flange seal that is used around the other edges of the door.

Other conventional closure seals employ slanting edges upon which are fastened one or more flexible seals which will be compressed with a sliding motion as the door is forced into a frame slightly larger than the door and having similarly slanting side edges. Such a closure involves wear on the gasketing material due to the sliding action during closing. It also requires a large force to close the door against the compressive restraint and sliding friction of the gasketing. Doors of this type also generally require several latches, usually of the refrigerator type, to bring the door to the sealed position and hold it sealed against the tendency to warp under the pressure of the sealing gasket.

An object of the present invention, accordingly, is to provide a new and improved apparatus for and method of effecting closure seals that shall not be subject to any of the above-described disadvantages. To the contrary, the present invention provides for a seal between the edge of, for example, a door and its frame that is effected by a pressure exerted by pressure feet moving in the plane of the door so as to seal a flexible gasket between the edge of the door and the frame after the door has closed and is in its final closed position. The present invention avoids the disadvantages of door sills and avoids, also, the need for any sliding of the gasket against the frame, providing an airtight seal between the door and the frame around its complete periphery.

A further object of the present invention is to effect an airtight seal between a closure and a wall by means of energy stored within the sealing mechanism during the act of opening or closing the closure, and, in addition, to provide a means for releasing the seal as a result of turning a conventional door knob or the like at the time the closure is to be opened.

Another object is to provide a weatherproof door such as may be used to advantage in a domestic dwelling or in a commercial building.

A further object is to provide an airtight seal for a closure that shall not be subject to release by the disruption of electric power, by the leakage of fluid from the sealing mechanism or by the slow release of energy within the system over a long period of closure.

Still another object is to provide a novel seal means which operates to provide an airtight seal for the closure after the closure is latched in its closed position so that the seal gasket experiences a minimum of sliding wear.

Another important object is to provide an airtight seal which will not interfere with the normal closing of a door nor cause any noticeable change in the operation normally used for closing a door, and that gives rise neither to a strain against the door latch or to warping strain on the door which would tend to unseal the door in any region.

Other and further objects will be explained hereinafter and will be more particularly pointed out in the appended claims.

A preferred embodiment of the invention is illustrated in the accompanying drawing, shown applied to a door closure. It is distinctly to be understood, however, that this is but by way of illustration and that the invention is not only susceptible to modification, change and other arrangements of parts, without departing from the spirit and scope of the invention, but that the invention may clearly be used to provide a seal for closures other than doors.

In the drawings, FIG. 1 is a side elevation of a door constructed in accordance with the present invention and illustrated in the closed and sealed condition, with the moving parts in location substantially as they would appear with the hereinafter described removable panel, the stiles and bottom rail of the door partially cut away;

Figure 1:
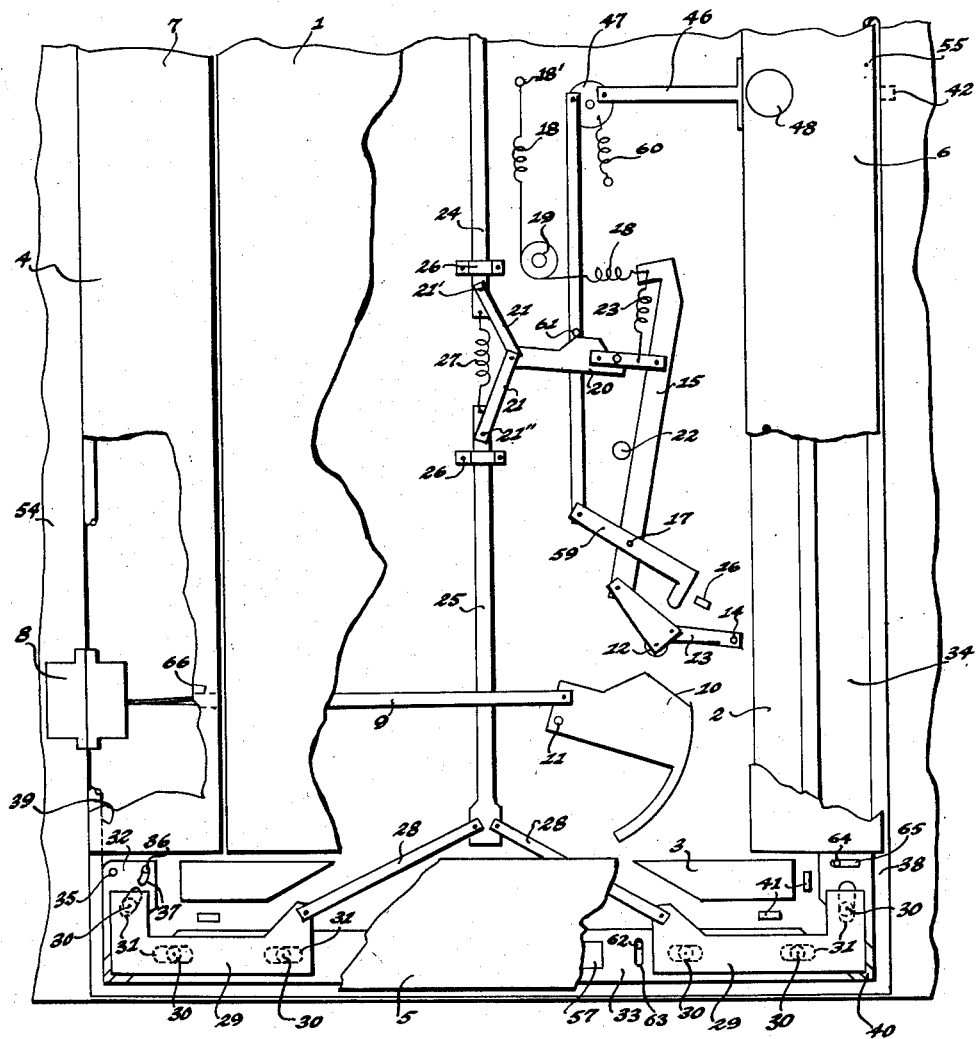
FIGS. 1A, 2A, 3A, 4A and 5A are fragmentary top elevations showing the door in its relation to its frame for the successive positions illustrated, respectively, in FIGS. 1, 2, 3, 4 and 5.
Figure 10:
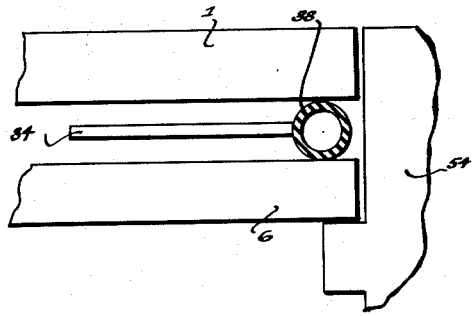
Figure 11:
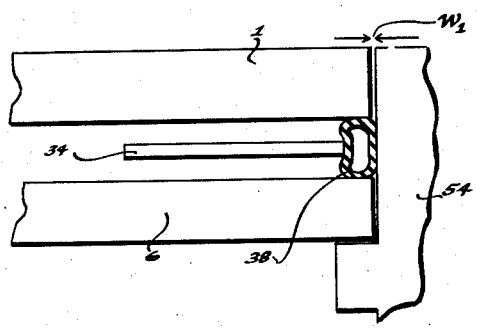
Figure 12:
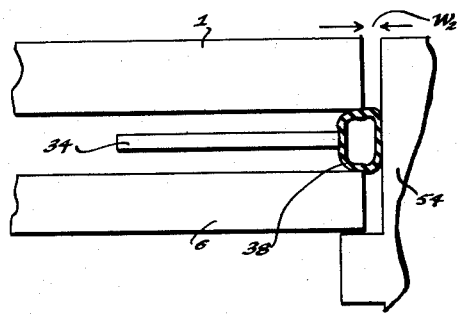
Figure 13:
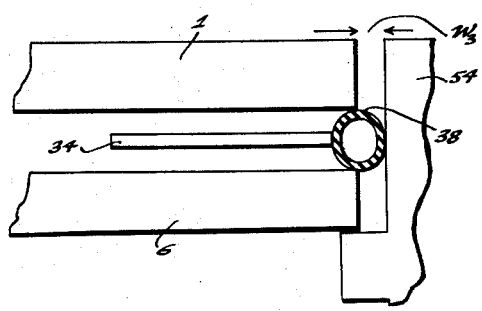
Figure 17:
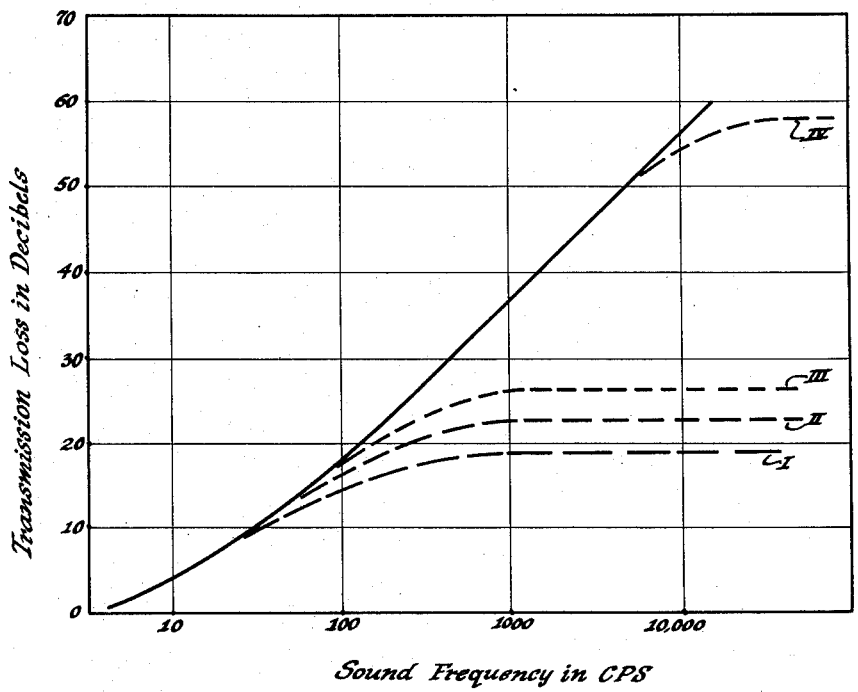

8, illustrating the sealing gasket in the sealed position, as shown in FIG. 1;

FIG. 10 is a cross-section through the knob side stile of the door showing the later described movable foot and the seal in the retracted position;

FIGS. 11 through 13 are views similar to FIG. 11 showing how the seal itself will deform so that complete sealing results even when the door frame may be warped or may, for some other reason, be not parallel to the edge of the door;

FIG. 14 is a fragmentary enlarged view of the lower edge of the door on the hinge side showing how the hereinafter mentioned groove in the stile is staggered slightly to avoid the hinge;

FIG. 15 is a section taken along the line 15—15 of FIG. 8, looking in the direction of the arrows and illustrating the later described hole location for the cam rod;

FIG. 16 is a view similar to FIG. 15 but with the door in the closed position, and showing, more particularly, the manner in which sealing is accomplished by that portion of the seal lying in the stile groove; and FIG. 17 presents a graph illustrating the transmission of sound through a two-inch solid core pine door as a function of frequency, and shows the effect of an air leak of a given size or a crack of a given width around the edge of the door upon the effective sound transmission loss of the door.

*Closed Structure*

Referring to FIG. 1, the principal structure of the door is illustrated as a thick solid wood core or similar main panel 1 which is substantially the width and height of the opening defined by the frame 54. Secured to this panel 1, as by screws or glue, is the knob stile spacer 2, bottom and top rail spacers 3, and the hinge stile 4. The other wooden or similar parts of the door may be removable, consisting of the bottom and top rails 5, the knob side stile 6 and the resiliently mounted insert panel 7. Supporting hinges 8 are mounted partially in the main panel 1 and partially in the hinge stile 4. Other than the hinges and the hole through the panel to accommodate the knob, the entire mechanism is located and operates between the main panel 1 and the insert panel 7, rails 5 and the knob side stile 6.

*Closure Mechanism*

A cam rod 9 extending through a hole 66 drilled through part of the hinge stile 4, and the outer panel 1, as more clearly shown in FIG. 15, is pinned or otherwise fastened to the lower invisible or other type hinge 8 through which a cable or rod can be secured to the nonmoving part of the hinge, as later explained. Thus, opening or closing the door causes a movement of the rod 9 more or less in proportion to the amount of door movement. The other end of the rod is pivotally mounted on a cam 10 which rotates about cam pivot 11 rigidly attached to the door main panel 1. The face of the cam 10 may contact a roller 12, FIGS. 3 and 4, which is attached to the links forming main spring toggle 13. The right-hand end of the toggle 13 is pivotally mounted on a main spring toggle pivot 14 attached to the panel 1. The other end of the toggle 13 is rotatably pinned to the lower end of an arm 15. A main spring toggle stop 16, attached to the toggle 1 determines the "locked" position of this lower toggle, as more particularly illustrated in FIGS. 4 and 5. The arm 15, in turn, is rotatably mounted to an arm-and-seal release trip pivot 17, also attached to the main panel 1.

Figure 2:
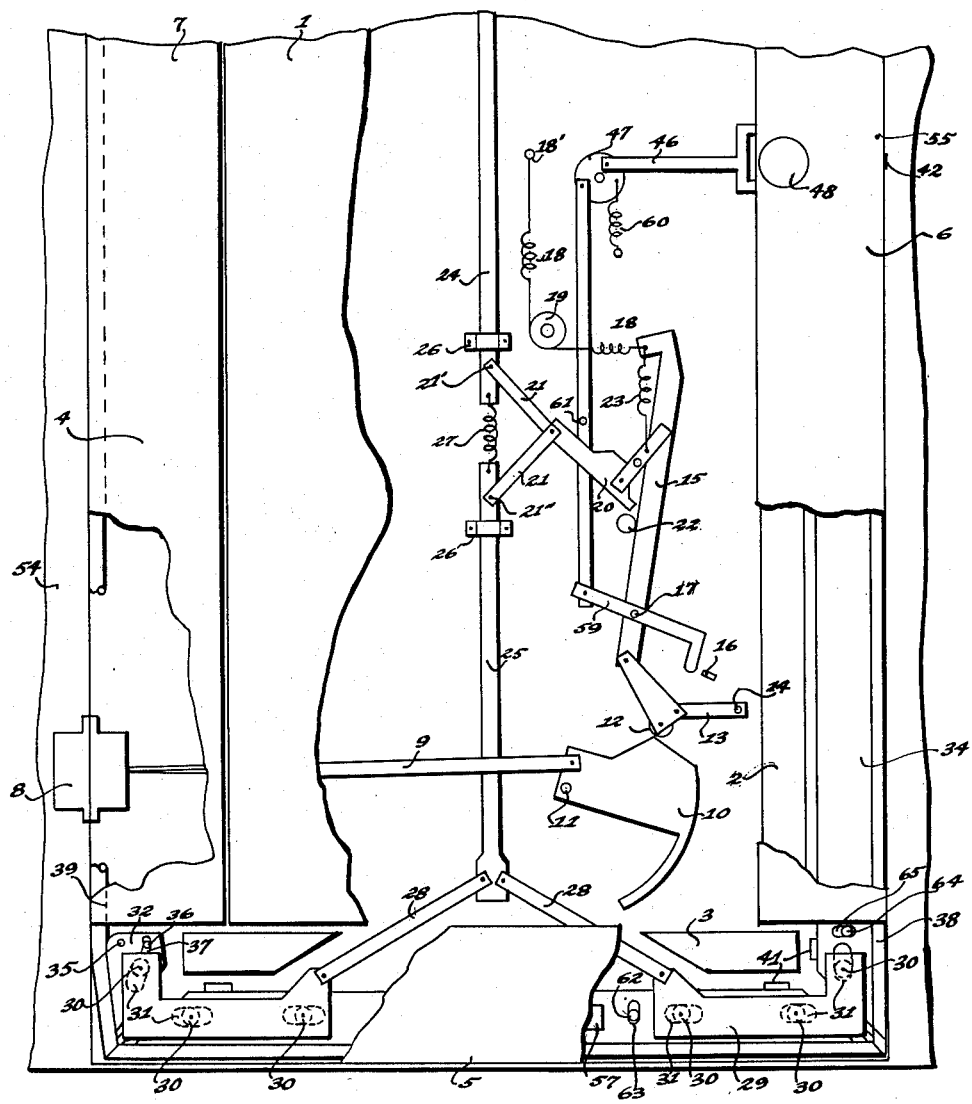
FIG. 2 is a similar view showing the door closed but with the seal released by turning the door knob, but prior to opening the door.

To the upper end of arm 15 is attached the lower end of the main tension spring 18. This tension spring 18 is bent around a sheave 19 secured to the panel 1, and its upper end is also rigidly attached to the panel at 18'. Also rotatably attached to the arm 15 is the right-hand end of seal release toggle 20. The other or left-hand end of the toggle 20 is rotatably pinned to two main link rods 21. The locked position of this upper toggle 20 may be determined by a lip on one link and limiting stop on the other, as is well-known, but not shown in order to avoid confusion in the drawing. A stop 22 limits the counter-clockwise movement of the arm 15, as illustrated in FIG. 2. A small tension spring 23 attached to the upper end of the arm 15 and to the seal release toggle 20 tends to keep the latter in a locked position.

The free ends of the two main link rods 21 are rotatably pinned to the bottom of the upper vertical rod 24 and the top of the lower vertical rod 25, as at 21' and 21", respectively, FIG. 1. Each of these link rods 21 operates through a guide 26 which is attached to panel 1. A seal return spring 27 acts normally to pull the inner ends of the vertical rods 24 and 25 together. The outer ends of the vertical rods 24 and 25 connect with mechanisms at the top and bottom of the door that are identical, so that only the lower portion is shown in detail and will be now described. Link rods 28 are rotatably divergently pivoted to the vertical rod 25 and connect the same with identical right-hand and left-hand corner plates 29. In the door sealed position of FIG. 1, the angle that each of these link rods 28 makes with the bottom of the door is equal to the angle whose tangent is the ratio of the door's width to its height. On a door 34 inches wide and 80 inches high, for example, the angle would be 23°. The reason for this construction is to insure that the forces exerted horizontally and vertically will be distributed in proportion to the lengths involved.

Each corner plate 29 has three rollers 30 pinned to it, but free to rotate. Each roller 30 moves within a slot 31 in a pressure foot; the uppermost slots 31 in respective right-hand and left-hand pressure feet 34 and 32, and the lower slots 31, in a pressure foot 33. The width of the slot 31 substantially equals the roller diameter, as perhaps more clearly seen in FIG. 8. The foot 34 is almost the full height of the door on the right-hand or knob side; foot 33 is almost the full width of the door; but the left-hand two feet 32, top and bottom, are very short and rotate through small angles about pressure foot pivots 35. A small stop pin 36 attached to the panel 1 limits the movement of the foot 32 by contacting the end of a slot 37. A seal 38 of resilient tubing, as of rubber and the like, is cemented or otherwise secured to the bottom of a groove 39 in the hinge stile 4 and along the outer edges of the five pressure feet, preferably to within about three inches of the corners of the seal. Each corner plate 29 has attached to it a small adjustable corner insert 40 for properly positioning the adjoining corner of the seal 38. The inward movement of the feet 33 and 34 is limited by stops 41. Small felt pads 57 cemented to the outer panel 1 and to the stile 6 and rail 5 centrally locate the feet 32, 33 and 34 in the space in which they move, and, though not retarding their movement, prevent rattle and the transmission of sound to the wood or similar parts of the door.

Figure 8:
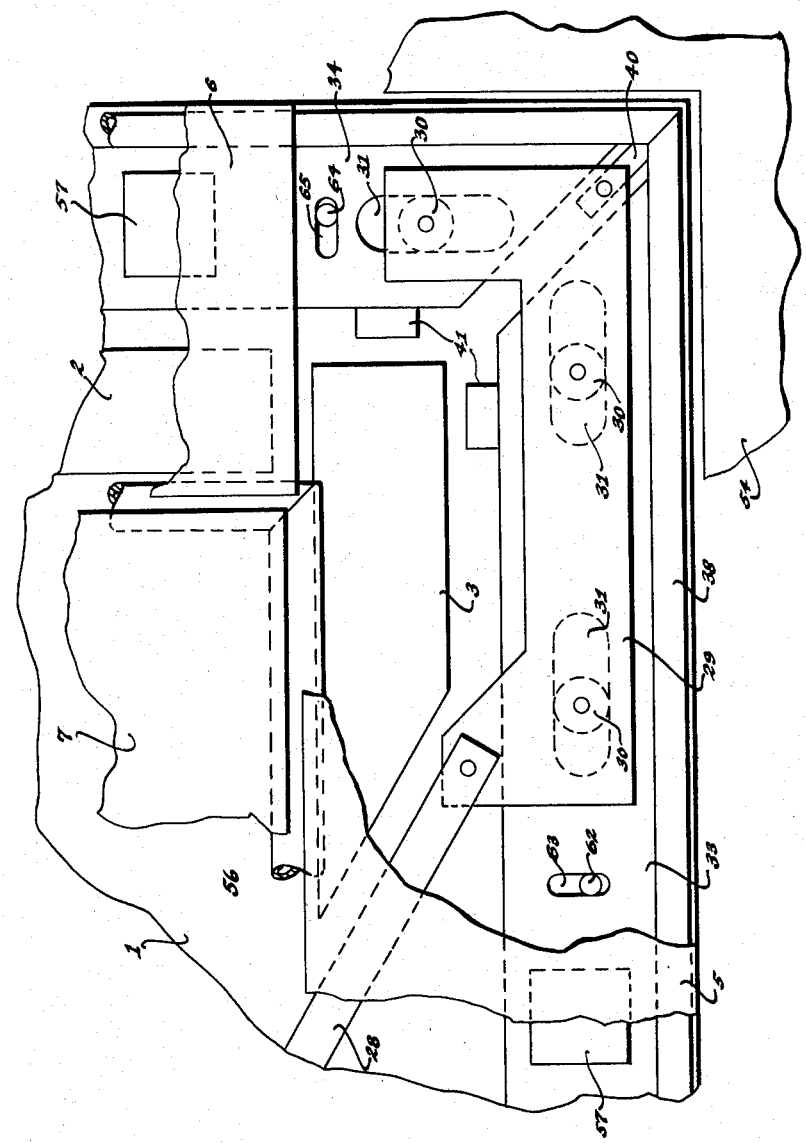
FIG. 8 is a fragmentary, enlarged view of the bottom corner section on the knob side, illustrating more clearly the sealing gasket in the retracted position when the seal is released, as shown in FIG. 2.
Figure 9:
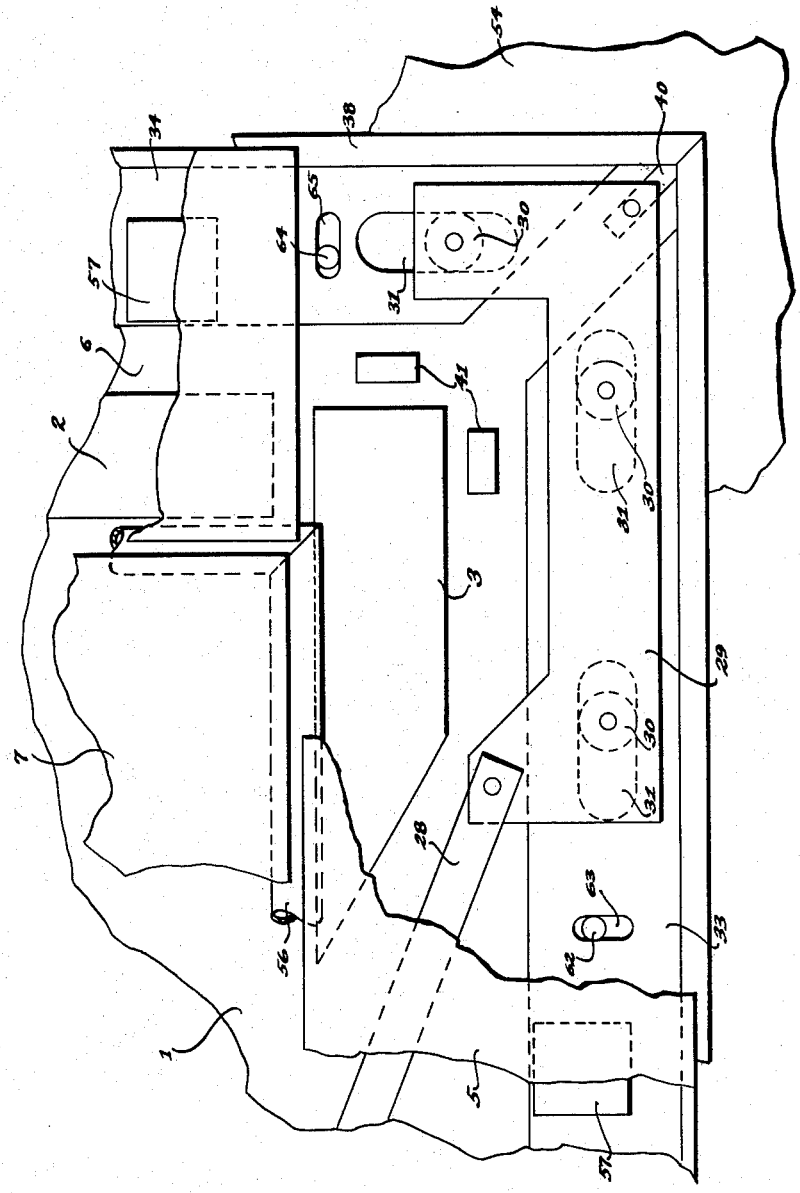
FIG. 9 is a fragmentary enlarged view similar to FIG.

As more particularly illustrated in FIGS. 8 and 9, a guide 62, rigidly attached to the outer panel 1, protrudes through a slot 63 in the horizontal pressure foot 33 to insure vertical movement only. Similarly, a guide 64, rigidly attached to the outer panel 1, protrudes through a slot 65 on the vertical pressure foot 34 to insure horizontal movement only and also to serve to support the weight of the foot.

Figure 6:
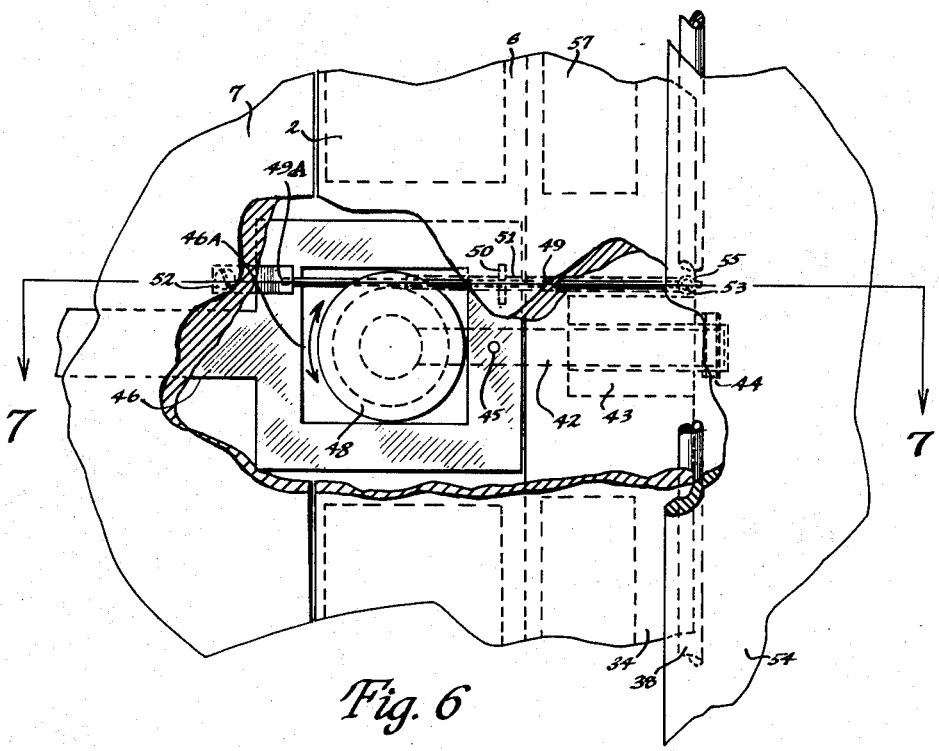
FIG. 6 is a fragmentary enlarged view of the mechanism surrounding the door knob when the door is closed and sealed.
Figure 7:
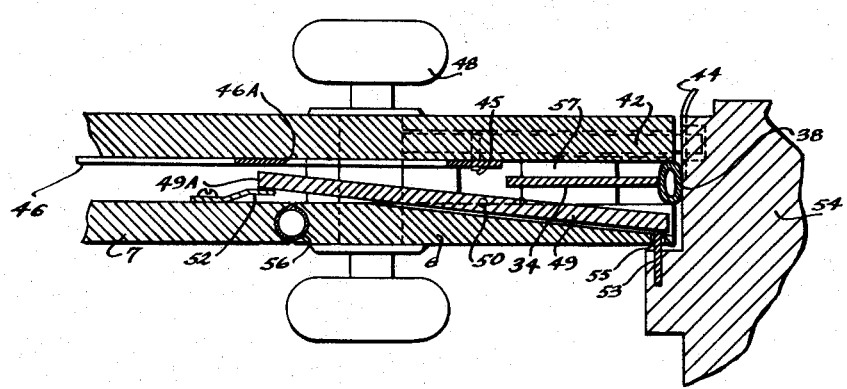
FIG. 7 is a sectional view taken along the line 7—7 of FIG. 6, looking in the direction of the arrows.

Referring, now to FIGS. 6 and 7, a bolt or latch 42 moves within a bolt guide 43 recessed within the panel 1. The bolt when extended in the door-closed position, is received in a strike plate 44. A pin 45 which is a part of the bolt 42, protrudes through a hole in a bolt extension 46 and the other end of this extension 46 is rotatably pinned to the seal release crank 47, FIG. 1, which, in turn, rotates about a pivot rigidly attached to the panel 1.

When the bolt 42 is withdrawn by turning the knob 48 and the door is open, the innermost end of an interlock arm 49, FIGS. 6 and 7, moving about a pivot 50 and in a slot 51 cut in the stile 6, is forced against the panel 1 by a leaf spring 52. When the knob 48 is released, the spring 60 acts to move the bolt 42 outwards. The bolt extension 46, of the bolt 42, is stopped by the interlock arm 49 and the bolt 42 remains within the door. When the door is closed, a jamb pin 53 mounted on the door frame 54 protrudes into a hole 55 on the knob stile 6. The pin 53, contacting the outer end of interlock arm 49, overcomes the resistance of the interlock spring 52 and the bolt extension 46 can now move without interference. The interlock spring 52 is attached to insert panel 7 which is preferably structurally isolated from the door and mechanism by means of a resilient mount 56.

Extending downward from the crank 47, where it is pivotably mounted, is a release rod 58. At its lower end, it is pivotably attached to the main spring release lever 59 which, in turn, moves about the pivot 17 common to arm 15. Acting to hold the bolt 42 in the out position by means of the bolt extension 46 is the release rod spring 60 attached to the crank 47 and to the panel 1. Mounted upon the release rod 58 is an adjustable trip 61 which, when the bolt 42 is out and the arm 15 is to the left, lies just above the seal release toggle 20.

Operation

Figure 1A:
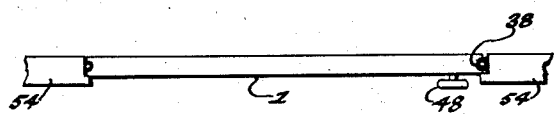

FIGS. 1 and 1A show the door in the closed position. The closure gasket seal 38 is held outward in its expanded position against the door jamb 54 and floor (or threshold) by pressure exerted by the feet 32, 33 and 34 and by the squeezing of the seal 38 in the stile groove 39. Force of the main spring 18 is applied to the feet through arm 15, toggle 20, main link rods 21, vertical rods 24 and 25, link rods 28 and rollers 30 on corner plates 29 acting on foot slots 31.

Figure 2A:
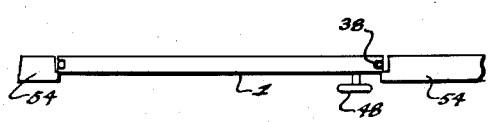

In FIGS. 2 and 2A, the door knob or latch 48 has been turned, withdrawing bolt 42, and moving a bolt extension 46 to the left. Crank 47 thereby turns on its pivot to force the release rod to break toggle 20, thus allowing arm 15 to move forward to stop 22. All of the effective force of the main spring 18 is then exerted against stop 22 and, as a result, all force from the main spring 18 is released from the main link rods 21 so that the said link rods 21 may move freely as the vertical rods 24 and 25 are drawn toward each other, primarily under the action of the spring 27 (although some initial assistance may result from a compressive reaction force between the seal 38 and the door frame, which force is transmitted to the vertical rods 24 and 25 through the pressure feet 32, 33, 34 and the seal through corner plates 29 and link rods 28). This movement of the vertical rods 24 and 25 pulls the pressure feet 33 and 34 inward against stops 41 and pressure feet 32 against stops 36. This operation withdraws the seal 38 to its retracted position.

Figure 3:
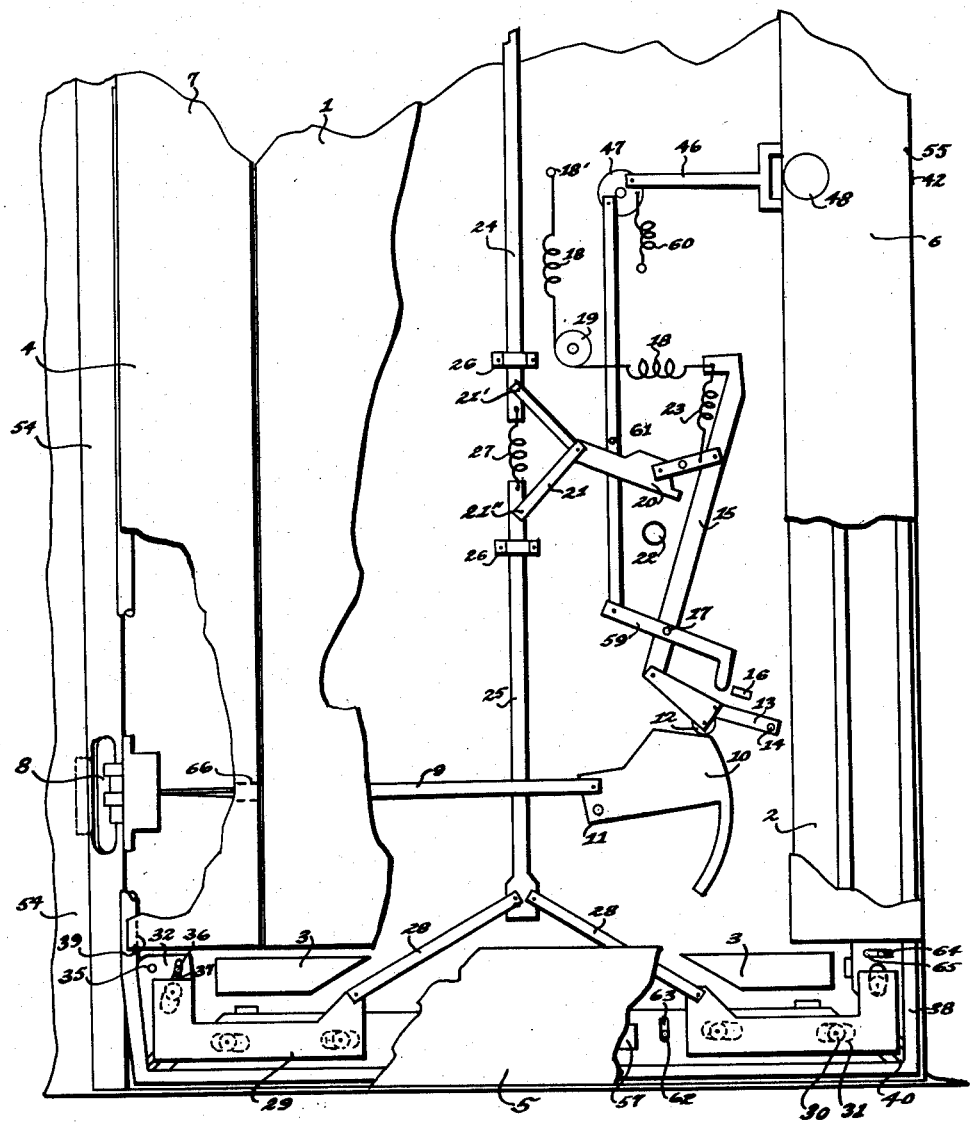
FIG. 3 shows a similar view of the door partially opened, but prior to the completion of the operation by which energy is stored in the later described main sealing spring.
Figure 3A:
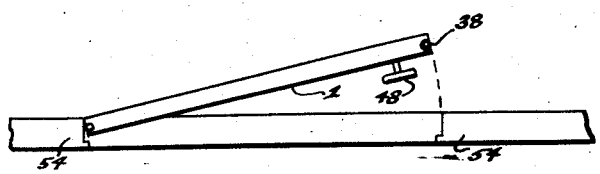

The door is shown in a partially opened position in FIGS. 3 and 3A. Cam rod 9 attached to the portion of hinge 8 mounted in the door frame 54 moves to left through hole 66 as the door is opened, moving cam 10 counterclockwise about pivot 11. The cam 10 contacts and forces roller 12 upward, thereby expanding the toggle 13 toward the left, since the right-hand end is fixed by pivot 14. The expansion of toggle 13 turns arm 15 clockwise about pivot 17 causing an extension of the main spring 18 which results in a storage of energy within said main spring. Simultaneously, as arm 15 moves clockwise, toggle 20 expands and is urged toward its locked position by spring 23. Further opening of the door beyond the point shown in FIGS. 3 and 3A causes roller 12 to travel slightly beyond the point at which the toggle 13 is fully expanded. The toggle 13 thus passes dead center and locks open against stop 16, and in this process, the main spring 18 is stretched and sufficient energy is stored therein to actuate the door-sealing and release mechanisms in subsequent phases of the operating cycle. At the same time, toggle 20 is brought to its fully locked position by spring 23.

It is to be understood that the main spring 18 may be replaced by one or more weights which are lifted by the action of opening the closure in order to store the energy. Other means of storing energy, such as separating attracting magnets, the compression of a pneumatic cylinder, or the twisting of a rod, might equally be substituted for the preferred spring storage mechanism above described, and still be fully within the scope of the invention. Similarly, the closure-operating mechanism might equally well be confined within the door frame to cause a compression seal to move against the edge of the door. The door is now unsealed and can be opened. The bolt 42 is held within the door by an interlock which is described later.

Figures 4, 4A:
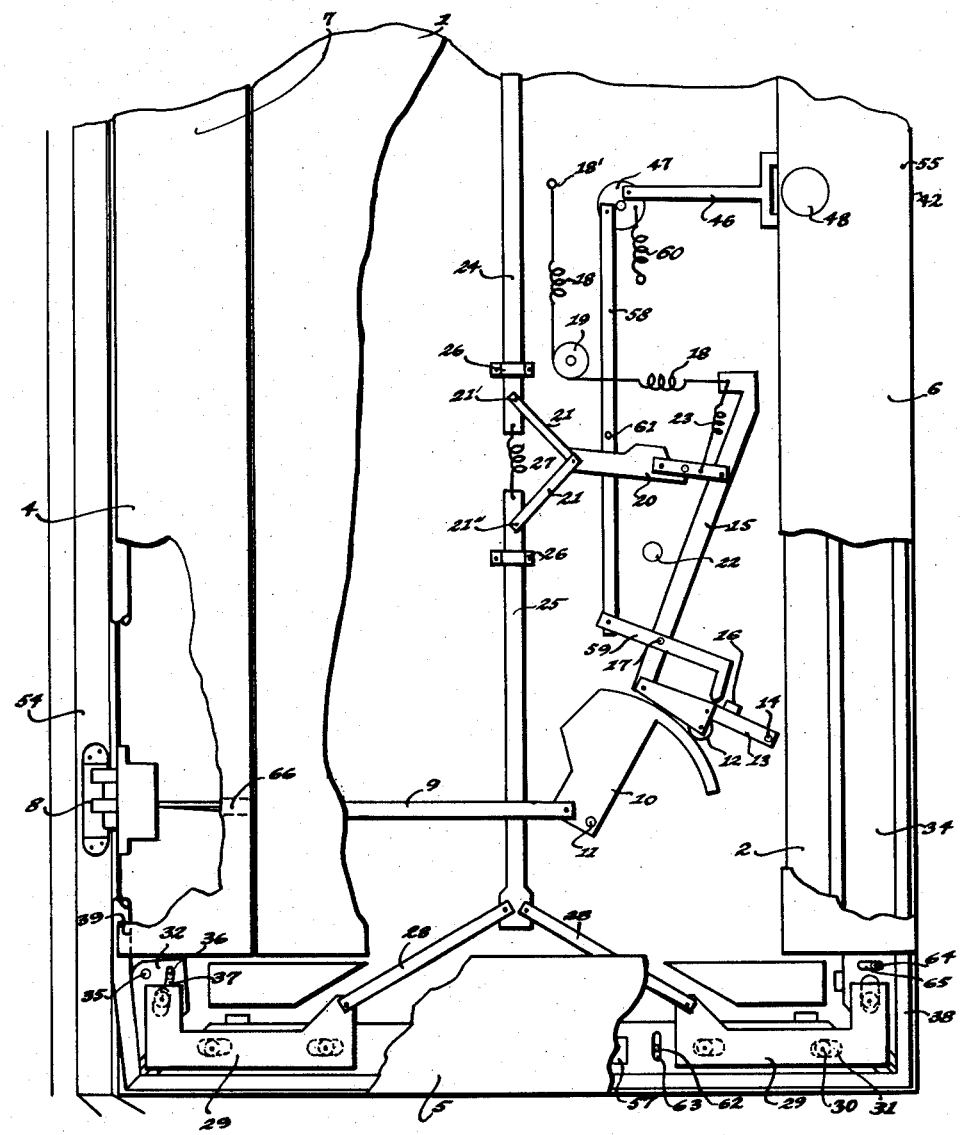
FIG. 4 is a similar schematic drawing showing the door opened sufficiently so that the sealing spring is fully cocked, the cocking mechanism has disengaged and the door is then free to swing wide open or shut without further effect on the door mechanism.

The door is at a mid-open position in FIGS. 4 and 4A, but at a point beyond where the toggle 13 has attained its locked position against the stop 16. The cam 10 no longer contacts the roller 12 and has no effect on the door operation except that the presence of the cam prevents tripping of the toggle prior to the closing of the door.

Figure 5:
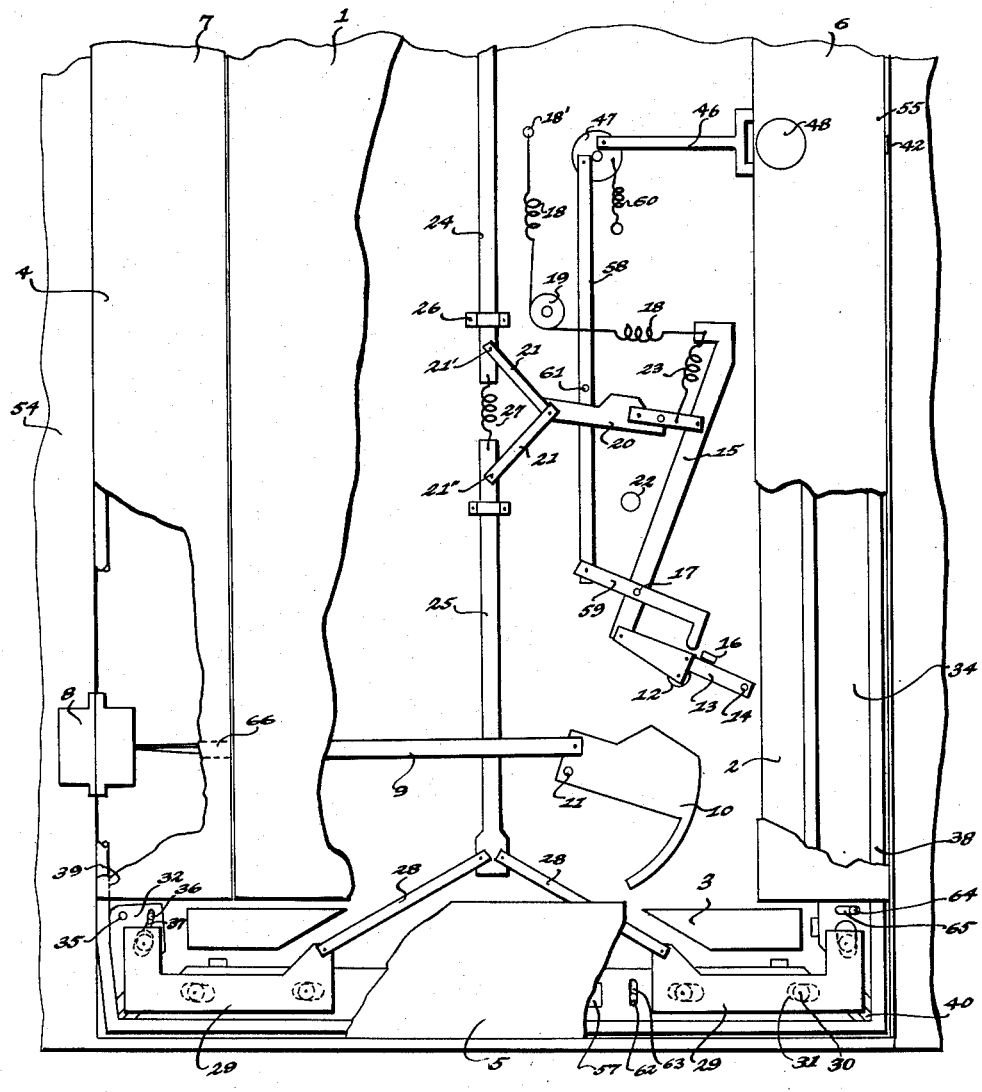
FIG. 5 is a similar view showing the door almost closed, but not yet sealed.
Figure 5A:
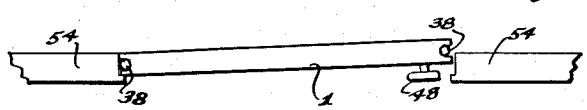

In FIGS. 5 and 5A the door is almost, but not quite, closed. As soon as the bolt 42 is permitted to drop into the strike plate 44 on the jamb, the bolt extension 46 will move to the right, aided by spring 60 through crank 47. This action will move rod 58 upward, causing lever 59 to turn clockwise about pivot 17. The right-hand end of the lever will break the toggle 13. At this point, the energy stored in main spring 18 moves arm 15 counterclockwise about pivot 17 and forces toggle 20 to the left, thereby transferring part of the stored energy to spring 27 to be used later in releasing the seal, and employing as much of the remaining stored energy as necessary to move the pressure feet 32, 33 and 34 in order to force gasket 38 into intimate contact with the door jamb, effecting a substantially airtight seal. This sealed condition is shown in FIGS. 1 and 1A.

FIGS. 6 and 7 illustrate the manner in which the bolt interlock and tripping mechanism operates. When the door is open, the end 49A of the interlock arm 49 acts as a dog, and, under the action of leaf spring 52, is held against panel 1, engaging the bolt extension 46 at the lip 46A. This results in holding the bolt 42 within the door even after the door knob 48 is released. When the door is closed, however, jamb pin 53 enters the hole 55 in stile 6 and forces the interlock arm 49 in slot 51 counterclockwise against the action of the leaf spring 52 attached to the insert panel 7. This action of freeing the bolt extension 49 allows the bolt 42 to slide into the strike plate 44 and simultaneously trips the sealing mechanism, as previously described. To open the door, the knob 48 is turned. This action moves the bolt extension 46 to the left and simultaneously releases the seal. As soon as the door is moved, pin 53 no longer holds the arm end 49A away from the lip 46A in the bolt extension 46. The interlock arm end 49A then engages the bolt extension lip 46A and the bolt 42 is held in the retracted position. When the door is closed, the jamb pin 53 strikes the interlock arm 49, releasing the bolt extension 46 and simultaneously allowing the bolt 42 to enter the strike plate 44 and tripping the sealing mechanism, as previously described.

The lower right-hand corner of the door with the mechanism in the unsealed and sealed positions is illustrated in greater detail on FIGS. 8 and 9. Tension on link rod 28 holds the feet 33 and 34 retracted against stops 41. The hollow rubber or similar seal 38, cemented or otherwise secured to the feet to within a few inches of the corner, is shown withdrawn slightly within the door, FIG. 8. When the sealing mechanism is actuated, the corner plate 29 moves downward and to the right by the action of the link rod 28. The vertical motion is conveyed to the pressure foot 33 through two rollers 30 which are confined to move in the slots 31 of pressure foot 33. The pressure foot 33 is constrained to a vertical motion by guide 60 attached to the panel 1 and protruding through a vertical slot 63 in the pressure foot 33. The horizontal motion of the corner bracket 29 is similarly conveyed to pressure foot 34 which is constrained to a horizontal motion by guide 64 in slot 65. The direction of the force exerted by link 28 in its final position when the door is sealed, as shown in FIG. 9, is adjusted to provide a division of the force into vertical and horizontal components exerted respectively against pressure feet 33 and 34 in direct proportion to the lengths of pressure feet 33 and 34, respectively, so that the gasket will experience a uniform compressive force per unit length along each edge of the door. Normally, one foot will start to move before the other. Foot 34, for example, may first move to the right until the seal starts to be deformed by the frame; then, foot 33 will move downward until the seal contacts the floor. Both feet will thereafter move together keeping the forces in balance as the seal compresses in both directions. The motion of the seal requires a small amount of stretching of the seal material against an initial tension. This stretching occurs in the first few inches of the seal where it is not attached to the pressure feet. The adjustable corner insert 40, attached to corner plate 29, forces the mitered joint of the seal into the extreme corner of the door. For each of the four corners of the door, only two relatively small sections of the seal remain unsupported; the stiffness of the seal material being such as to be sufficient to carry the compressive load across this unsupported length and to provide a continuous airtight seal across this region.

FIGS. 11 through 13 show the typical amount of seal deformation that takes place to compensate for three different-sized crack widths, $W_1$, $W_2$, $W_3$, on one edge of the door, compared with the seal in the retracted position, when the seal is operated from its retracted position of FIG. 10. In FIGS. 11, 12 and 13, the foot 34 is at the same distance from the edge of the door, but because of warpage or wear (as in the case of the center of a threshold), the gap is greater in the middle than at the ends. Because of unequal deformation, the seal 38 not only is in continuous contact with the frame 54 but, in addition, it prevents the passage of airborne sound or leakage of air between itself and the inside surfaces of the gap in the door in which the seal moves.

By diverting the seal groove 39 in the stile 4, provision can be made to accommodate relatively thick hinges 8, as more particularly shown in FIG. 14. FIGS. 15 and 16, moreover, show a partial section through the door just above the lower hinge 8, FIG. 14. The two views of FIGS. 15 and 16 represent the door open and closed and illustrate the manner in which the round seal 38 is squeezed in groove 39 when the door is closed. FIG. 15 shows, in addition, the general location of the hole 66, partly in stile 4 and partly in the outer panel 1, and through which the cam rod 9 operates. Both views, furthermore, show the manner in which the internal mechanisms of the door are covered by the panel insert 7 that is held in position, flush with the front surface of the stile 4, by means of the flexible seal 56, forming a resilient airtight connection. The escape of airborne sound from the door mechanism is thus also prevented and there is provided further sealing against airborne noise which may be transmitted through the outer panel 1, from the opposite sides of the closure. The seal also provides a barrier against the transmission of solidborne noise from the stiles 4 and 6 to the insert panel 7, thereby preventing such noise from being radiated from the panel to the air on the quiet side of the door. The seal works in the reverse manner, of course, when the noise strikes the front panel and attempts to cross the rubber seal to the stile and thence to the back panel of the door.

In FIG. 17, the transmission loss of a door is plotted vertically in decibels (db) against the frequency of the sound striking the door plotted in cycles per second on the horizontal axis. Transmission loss of a 2 in. solid core, pine door is plotted as the solid curve representing the theoretical transmission loss of such a door based upon the mass law for sound transmission. The effect of an air leak between the edge of the door and the frame is to reduce the total transmission loss. For example, considering a normal door two and a half feet wide and six and a half feet high, a crack of ⅛ inch around its periphery, as is characteristic of ordinary doors, will limit the transmission loss to a total of 19 db, as illustrated by the dashed curve I; reducing the crack to 1/16 inch, as might be obtained with a very well fitted ordinary door, the transmission loss will still be limited to 22 db, as shown in curve II. Even for a crack of 1/32 inch, which is materially less than can be obtained by any conventional door, the transmission loss is still limited to 25 db, as illustrated by the dashed curve labelled III. With the peripheral gasket enclosure described in subject invention, it is possible to obtain substantially complete sealing around all edges. As a practical limit, it is reasonable to expect small openings at the corners to total an area no greater than about 1/16 inch square. Under this circumstance, the transmission loss obtainable with the present invention will increase with frequency to a limit of 58 db, as shown by curve IV. Where extremely quiet doors are required the gasketing arrangement described in this invention can be fitted and adjusted to attain a leak area so small that there will be no practical limit to the actual transmission loss of the door except the character of the material and construction of the door itself.

Further modifications will occur to those skilled in the art, and all such are considered to fall within the spirit and scope of the invention as defined in the appended claims.

What is claimed is:

1. A closure operable to open and closed positions with respect to a frame, having, in combination, a peripheral gasket movable at least in part between retracted and expanded positions, means operable as the closure is moved to its open position for storing energy remotely from said gasket as a result of such movement, linkage means operable upon movement of the closure to its closed position for causing part of the stored energy to be retained for subsequent use and another part to be transmitted to the gasket in order to move it to its expanded position, thereby to provide a seal between the closure and the frame, and linkage means operable upon the commencement of the opening of the closure for causing the retained part of the stored energy to be transmitted to the gasket to initiate the movement of the gasket to its retracted position.

2. The closure of claim 1, wherein said means for storing energy comprises spring means, and wherein said linkage means comprise link-rod-controlled pressure feet movable substantially in the plane of the closure for coupling the gasket with said spring means.

3. A soundproof door operable to open and closed positions with respect to a frame, having, in combination, a peripheral gasket movable at least in part between retracted and expanded positions, a door latch, spring means remote from said gasket operable as the door is moved to its open position for storing energy as a result of such movement, linkage means operable upon movement of the door to its closed position and closing of the latch for causing part of the energy stored in the spring means to be retained for subsequent use and another part to be transmitted to the gasket in order to move it to its expanded position, thereby to provide a seal between the door and the frame, and linkage means operable upon the commencement of the opening of the latch for causing the retained part of the energy stored in the spring means to be transmitted to the gasket to initiate movement of the gasket to its retracted position.

4. A soundproof door as claimed in claim 3 and in which the peripheral gasket is tubular.

5. A soundproof door as claimed in claim 3 and in which said linkage means comprise link-rod-controlled pressure feet provided substantially in the plane of the door for coupling the gasket with the spring means.

6. A soundproof door as claimed in claim 3 and in which the spring means comprises at least a pair of springs, one for storing energy as the door is moved to its open position and for effecting movement of the gasket to its expanded position upon closure of the door, and the other for receiving part of the stored energy from the said one spring when the door is closed and for imparting the received energy to return the gasket to its retracted position upon opening the latch.

7. A soundproof door as claimed in claim 3 and in which the door is hollow and all of the said means are disposed within the hollow, with an external knob connected to the said latch.

8. A soundproof door as claimed in claim 7 and in which one wall of the door comprises a panel vibration-isolated from the remainder of the door.

9. A soundproof door as claimed in claim 3 and in which the spring means is connected to be loaded upon opening the door through means connected to the door-frame section of a door hinge.

10. A soundproof door as claimed in claim 3 and in which means is provided for preventing tripping of the spring means until the door is closed.

11. A soundproof door as claimed in claim 3 and in which interlock means is provided for preventing closure of the latch while the door is open and actuated by means carried upon the door frame for freeing the latch upon closure of the door.

12. A soundproof door as claimed in claim 11 and in which the interlock means comprises an arm maintained against the latch and the means carried by the door frame comprises a pin for freeing the said arm.

References Cited in the file of this patent

UNITED STATES PATENTS

| | | |
|---|---|---|
| 1,009,879 | Ackerman | Nov. 28, 1911 |
| 1,178,775 | Albright | Apr. 11, 1916 |
| 1,880,585 | Tibbets | Oct. 4, 1932 |
| 2,344,451 | Pankhurst | Mar. 14, 1944 |
| 2,500,000 | Lambert | Mar. 7, 1950 |
| 2,805,241 | Evans et al. | Sept. 10, 1957 |
| 2,805,741 | Evans et al. | Sept. 10, 1957 |

FOREIGN PATENTS

| | | |
|---|---|---|
| 398,941 | Great Britain | Sept. 28, 1933 |
| 98,831 | Sweden | Mar. 7, 1940 |
| 729,980 | Great Britain | May 11, 1955 |